United States Patent
Alasti et al.

(10) Patent No.: US 12,262,442 B2
(45) Date of Patent: Mar. 25, 2025

(54) MANAGED DISCONTINUOUS RECEPTION

(71) Applicant: DISH WIRELESS L.L.C., Englewood, CO (US)

(72) Inventors: Mehdi Alasti, Arlington, VA (US); Siddhartha Chenumolu, Ashburn, VA (US)

(73) Assignee: DISH Wireless L.L.C., Englewood, CO (US)

( * ) Notice: Subject to any disclaimer, the term of this patent is extended or adjusted under 35 U.S.C. 154(b) by 505 days.

(21) Appl. No.: 17/739,697

(22) Filed: May 9, 2022

(65) Prior Publication Data

US 2023/0363042 A1    Nov. 9, 2023

(51) Int. Cl.
H04W 76/28 (2018.01)
(52) U.S. Cl.
CPC .................................. H04W 76/28 (2018.02)
(58) Field of Classification Search
None
See application file for complete search history.

(56) References Cited

U.S. PATENT DOCUMENTS

| | | | |
|---|---|---|---|
| 9,949,243 B2 * | 4/2018 | Gupta | H04W 72/04 |
| 10,917,847 B2 * | 2/2021 | Nam | H04W 52/0235 |
| 2015/0304883 A1 | 10/2015 | Tabet et al. | |
| 2016/0057044 A1 * | 2/2016 | Koc | H04W 24/02 370/311 |
| 2017/0359783 A1 | 12/2017 | Vangala et al. | |
| 2023/0209645 A1 * | 6/2023 | Li | H04W 52/0235 370/329 |

FOREIGN PATENT DOCUMENTS

WO    WO 2022052062 A1    3/2022

OTHER PUBLICATIONS

Sharetechnote.com [online], "4G/LTE—DRX," Jul. 13, 2012, retrieved on Sep. 21, 2022, retrieved from URL<https://www.sharetechnote.com/html/Handbook_LTE_DRX.html>, 5 pages.
International Search Report and Written Opinion in International Appln. No. PCT/US2023/020422, mailed on Aug. 22, 2023, 17 pages.
Moradi et al., "Flexible DRX optimization for LTE and 5G," IEEE Transactions on Vehicular Technology, Nov. 7, 2019, 69(1):607-621.

* cited by examiner

*Primary Examiner* — Brian S Roberts
(74) *Attorney, Agent, or Firm* — Fish & Richardson P.C.

(57) ABSTRACT

A base station of a cellular network determines that a mobile device is in an ON period of a discontinuous reception (DRX) cycle. The base station determines that a number of data units in a buffer corresponding to the mobile device is at least a threshold value. The threshold value is a number greater than one. In response to determining that the number of data units in the buffer is at least the threshold value and that the mobile device is in the ON period, the base station initiates transmission, to the mobile device over the cellular network, of at least some of the data units in the buffer. Some implementations include a latency timer that can trigger initiation of data unit transmission.

20 Claims, 13 Drawing Sheets

900

```
Determine, by a base station of a cellular network, that a mobile device is in an ON
period of a discontinuous reception (DRX) cycle.
902
```

```
Determine, by the base station, that a number of data units in a buffer corresponding to
the mobile device is at least a threshold value. The threshold value is a number greater
than one.
904
```

```
In response to determining that the number of data units in the buffer is at least the
threshold value and that the mobile device is in the ON period, initiate transmission, by
the base station to the mobile device over the cellular network, of at least some of the
data units in the buffer.
906
```

FIG. 9

MANAGED DISCONTINUOUS RECEPTION

TECHNICAL FIELD

This disclosure relates generally to discontinuous reception between user equipment and cellular network base stations.

BACKGROUND

Discontinuous reception is used by user equipment to conserve battery life. In a discontinuous reception scheme, the user equipment, such as a mobile device, alternates between (i) "sleep periods" in which the UE does not monitor a physical downlink control channel, preserving battery power, and (ii) "ON periods" in which the user equipment monitors the physical downlink control channel for downlink control information transmissions. Downlink control information transmissions can be associated with user data transfer (e.g., physical downlink shared channel transmission resource scheduling information), uplink power control, and slot format data, among other possible data types.

SUMMARY

Some aspects of this disclosure describe a method in which a base station of a cellular network determines that a mobile device is in an ON period of a discontinuous reception (DRX) cycle. The base station determines that a number of data units in a buffer corresponding to the mobile device is at least a threshold value. The threshold value is a number greater than one. In response to determining that the number of data units in the buffer is at least the threshold value and that the mobile device is in the ON period, the base station initiates transmission, to the mobile device over the cellular network, of at least some of the data units in the buffer.

Implementations of this and other methods described in this disclosure can have one or more of at least the following characteristics.

In some implementations, the method includes, subsequent to initiating transmission of the at least some of the data units: determining, by the base station, that the mobile device is in a second ON period of the DRX cycle; determining, by the base station, that a second number of data units in the buffer is less than the threshold value, where the second number of data units is greater than zero; and, in response to determining that the second number of data units in the buffer is less than the threshold value, determining, by the base station, to not initiate transmission of any of the data units in the buffer to the mobile device.

In some implementations, determining to not initiate transmission of any of the data units in the buffer includes at least one of: transmitting a sleep instruction to the mobile device, or determining to not transmit a wake up signal to the mobile device.

In some implementations, initiating transmission of at least some of the data units in the buffer includes initiating transmission of a predetermined maximum number of data units. The predetermined maximum number of packets is less than a number of all data units in the buffer.

In some implementations, the method includes, subsequent to initiating transmission of the at least some of the data units: determining, by the base station, that the mobile device is in a second ON period of the DRX cycle; and determining, by the base station, that a time duration an un-transmitted data unit has been in the buffer is greater than or equal to a time threshold. A second number of data units in the buffer is less than the threshold value, and the second number of data units is greater than zero. The method includes, in response to determining that the time duration the un-transmitted data unit has been in buffer is greater than or equal to the time threshold and that the mobile device is in the second ON period, initiating transmission, by the base station to the mobile device over the cellular network, of at least some of the data units in the buffer.

In some implementations, the method includes, subsequent to initiating transmission of the at least some of the data units: determining, by the base station, that the mobile device is in a second ON period of the DRX cycle; and determining, by the base station, that a time duration since a last prior initiation of transmission from the buffer to the mobile device is greater than or equal to a time threshold. A second number of data units in the buffer is less than the threshold value, and the second number of data units is greater than zero. The method includes, in response to determining that the time duration since the last prior initiation of transmission from the buffer to the mobile device is greater than or equal to the time threshold and that the mobile device is in the second ON period, initiating transmission, by the base station to the mobile device over the cellular network, of at least some of the data units in the buffer.

In some implementations, the method includes, in response to initiating the transmission: resetting a latency timer of the buffer to zero, or resetting the latency timer of the buffer to a time that an oldest data unit in the buffer has been in the buffer.

In some implementations, the buffer is a first buffer corresponding to the mobile device. The threshold value is a first threshold value. The base station stores a second buffer corresponding to the mobile device. The second buffer is associated with a second threshold value for transmission of data units to the mobile device, the second threshold value different from the first threshold value.

In some implementations, a number of data units in the second buffer is less than the second threshold value during the ON period, and the method includes initiating transmission, by the base station to the mobile device over the cellular network, of at least some of the data units in the second buffer during the ON period based on determining that the number of data units in the buffer is at least the threshold value.

In some implementations, the first buffer is associated with a first application of the mobile device, and the second buffer is associated with a second application of the mobile device.

In some implementations, the method includes determining the threshold value based on at least one of a quality of service requirement of an application associated with the buffer, a number of mobile devices being managed by the base station, or a channel quality of the mobile device.

In some implementations, the data units in the buffer are packets.

The implementations described herein can provide various benefits. For example, in some implementations, device power consumption can be reduced, and battery life can be improved, compared to alternative DRX schemes, by reducing an amount of time that mobile devices are in an ON state and/or by increasing discontinuous reception cycle time. In some implementations, a number of long-duration transmissions can be decreased compared to alternative DRX schemes. In some implementations, different applications and/or devices can be managed differently, with customized discontinuous reception parameters, in order to account for the different characteristics and requirements of the different applications and/or devices.

Methods described in this disclosure may be implemented at least as and using systems, devices (e.g., base stations), and non-transitory, computer-readable storage media. The details of the disclosed implementations are set forth in the accompanying drawings and the description below. Other features, objects, and benefits are apparent from the description, drawings, and claims.

DESCRIPTION OF DRAWINGS

FIG. 9 is a diagram illustrating an example of a data unit transmission initiation process.

The same reference symbol used in various drawings indicates like elements.

DETAILED DESCRIPTION

Figure 1A:
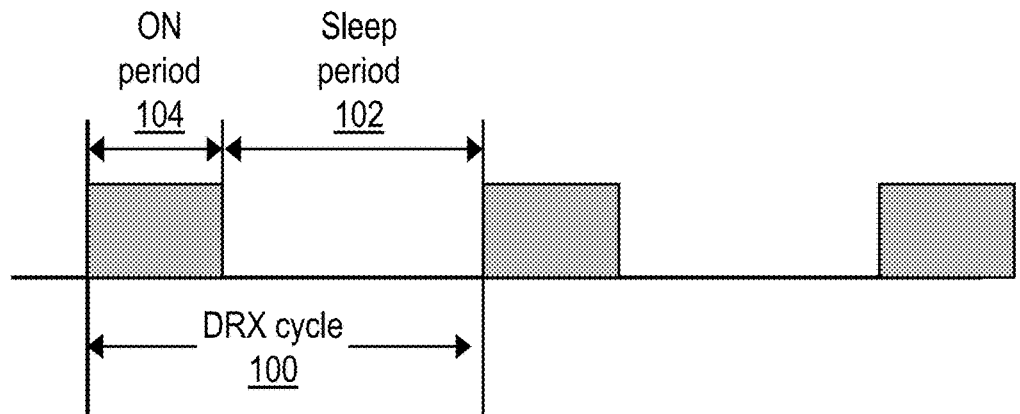
FIGS. 1A-1C are diagrams illustrating examples of discontinuous reception (DRX) schemes, according to some implementations of this disclosure.

Discontinuous reception (DRX) is a technique commonly employed in cellular networks such as 4G and 5G networks. As shown in FIG. 1A, during a DRX cycle 100, UE, such as a mobile device (e.g., a smartphone, a wearable device, a tablet, a personal computer, or another mobile device), alternates between a sleep period 102 and an ON period 104. During the sleep period 102, the mobile device conserves battery life by refraining from monitoring the physical downlink control channel (PDCCH), which carries downlink control information (DCI) messages from a base station to the mobile device. During the ON period 104, the mobile device scans for a PDCCH transmission intended for the mobile device. If such a transmission, such as a downlink control information (DCI) message, is received, the mobile device can take actions in response, such as downloading user data indicated in the DCI through a physical downlink shared channel (PDSCH) and performing reconfiguration to match instructions or protocol information included in the DCI.

DRX is a protocol implemented jointly between the mobile device and a base station, such as a wide area base station, a medium range base station, or a local area base station, e.g., a cell site/cell tower. A base station includes an antenna or transceiver for transmitting and receiving wireless signals to/from mobile devices, associated signal processing components (e.g., radio head components and/or baseband processing devices), and an associated computer system, including an interface with a backhaul network (e.g., to a base station controller over the backhaul network). The base station can communicate with a mobile device to jointly determine DRX parameters, or the base station can instruct the mobile device as to the DRX parameters. DRX parameters can include, in various implementations, ON period duration, sleep period duration, DRX duration (total cycle time), and/or, in some implementations, one or more other parameters described in more detail below, such as inactivity timer duration, minimum packet transmission threshold N, maximum single-transmission packet number M, and/or latency timer duration T. Alternatively, or in addition, the base station can act based on at least some of the parameters without the mobile device having to be aware of the parameters. Because the base station is aware of the mobile device's DRX behavior, the base station can time its PDCCH transmissions to align with ON periods of the mobile device.

Figure 1B:
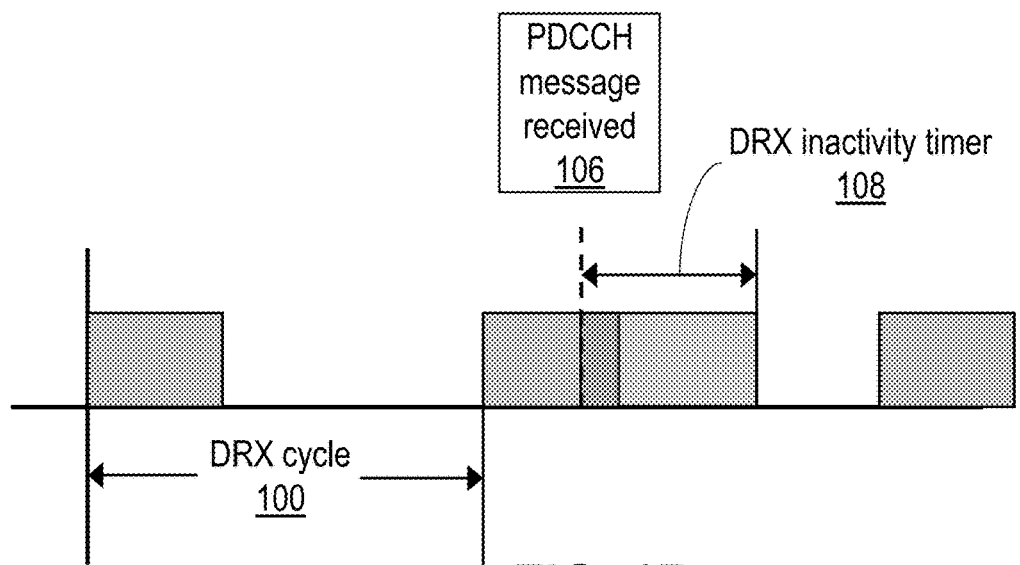

Some DRX implementations include more complex behavior than that shown in FIG. 1A. For example, as shown in FIG. 1B, in some cases, when a PDCCH message is received during the ON period 104 (106), the mobile device initiates a DRX inactivity timer 108, staying awake/ON for a certain period of time (inactivity timer duration). It is typically expected that data arrives in clusters, e.g., a probability of receiving additional data declines with time after receipt of a previous portion of data. The use of a DRX inactivity timer 108 allows mobile devices and base stations to allow for this tendency and reduce the chance that data receipt is delayed until a next as-scheduled ON period 104. However, in some cases, the use of an inactivity timer without the capability for sleep instruction transmission (as described below) can increase power consumption, because the mobile device may remain in the ON state even if no further messages are to be received.

Figure 1C:
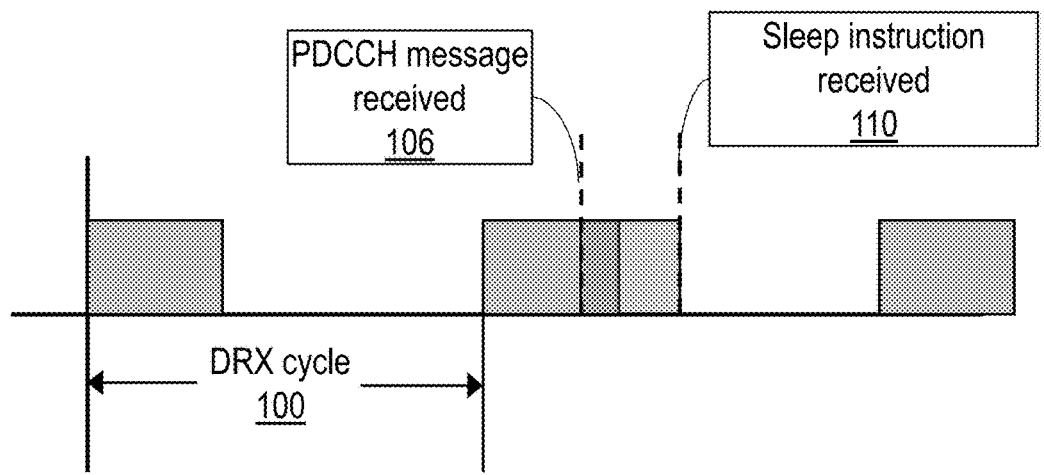

Some DRX implementations include dynamic ON-state/ sleep control by the base station. For example, as shown in FIG. 1C, in some implementations, after transmission of one or more PDCCH messages to a mobile device during an ON period 104 (106), the base station can determine that there is no further data to send (or that the base station will not send any further data) and, in response, transmit a sleep instruction to the mobile device (e.g., as a DCI message). When the sleep instruction is received (110), the mobile device returns to its sleep state.

In some implementations, instead of or in addition to sleep instruction transmission, a similar effect can be achieved using a wake up signal (WUS) method. In a WUS scheme, at the beginning of each ON period, if the base station has determined to initiate packet transmission, the base station sends a WUS to the mobile device over the PDCCH. The WUS may be a small message that consumes only a small amount of transmission bandwidth, such as a single bit. If the mobile device receives a WUS at the start of the ON period, the mobile device remains in the ON state. Otherwise, the mobile device enters the sleep state.

The use of sleep instructions and/or WUS can be combined with other aspects/implementations of DRX. For example, in some implementation, a mobile device will stay awake after receipt of a message until either its DRX inactivity timer times out or it receives a sleep instruction, combining the modes of FIGS. 1B and 1C. In some implementations, the base station is configured to send sleep instructions at times besides after transmission of a message, e.g., if a mobile device enters its ON period 104 and the base station determines that the base station will not send data during this ON period 104, the base station can transmit a sleep instruction to the mobile device (e.g., towards a beginning of the ON period 104) so that the mobile device returns to its sleep state and further conserves battery, without having to remain ON for the entirety of the ON period 104.

According to some DRX implementations, a base station has one or more buffers of packets to send to each mobile device. A single buffer can corresponds to all data for the mobile device, or different buffers can correspond to different types of data, e.g., separate buffers for voice data and application data and/or separate buffers for data for different applications. In each ON period of a mobile device, when any of the one or more buffers includes any packet to send to the mobile device, the base station initiates transmission of the packets to the mobile device, e.g., transmits a DCI message that coordinates (e.g., schedules) transmission of the packets to the mobile device over a PDSCH. The DCI message can tell the mobile device what network resources to use to obtain the packets, and the packets are subsequently transmitted to the mobile device in accordance with the DCI message. Other suitable methods of packet transmission initiation can be used instead or additionally.

However, because the base station in these DRX implementations initiates transmission whenever it has packets to send, this method is associated with relatively low (sleep time)/(ON time) ratios over each DRX cycle. For purposes of battery preservation, it is better for this ratio to be high:sleep time consumes significantly less battery power than does ON time. However, an increased share of sleep time (e.g., longer sleep periods) can be associated with increased latency. For example, if new packets arrive at a base station to be transmitted to a mobile device immediately after the mobile device's last ON period, the mobile device will have to wait the entirety of its sleep period before receiving the data. Accordingly, the selection of sleep period duration and ON period duration can be seen as a balancing act between battery life and latency.

Implementations according to this disclosure incorporate a minimum packet transmission threshold N, where N is a positive number greater than one. If a number of packets in a buffer to be sent to a mobile device is greater than or equal to N, then the base station initiates transmission of the packets during the mobile device's next ON period. However, if the number of packets in the buffer is less than N, the base station determines not to initiate transmission of the packets, even if N is nonzero.

Without a minimum packet transmission threshold N, there may be many separate packet transmission initiations over many separate ON periods, which can be inefficient: transmission of even a single packet is associated with DCI message transmission and network resource consumption. By contrast, over a given sequence of DRX cycles, the use of N would cause packet transmission to be initiated in fewer ON periods, but with more packets initiated in each ON period on average. Accordingly, when N is used, the ratio of sleep time to ON time during each DRX cycle can be increased. Sleep period durations can be extended (e.g., while maintaining ON period duration constant) for longer overall DRX cycles. Accordingly, battery life can be improved for mobile devices receiving data from base stations that use the managed DRX implementations described herein.

Figure 2A:
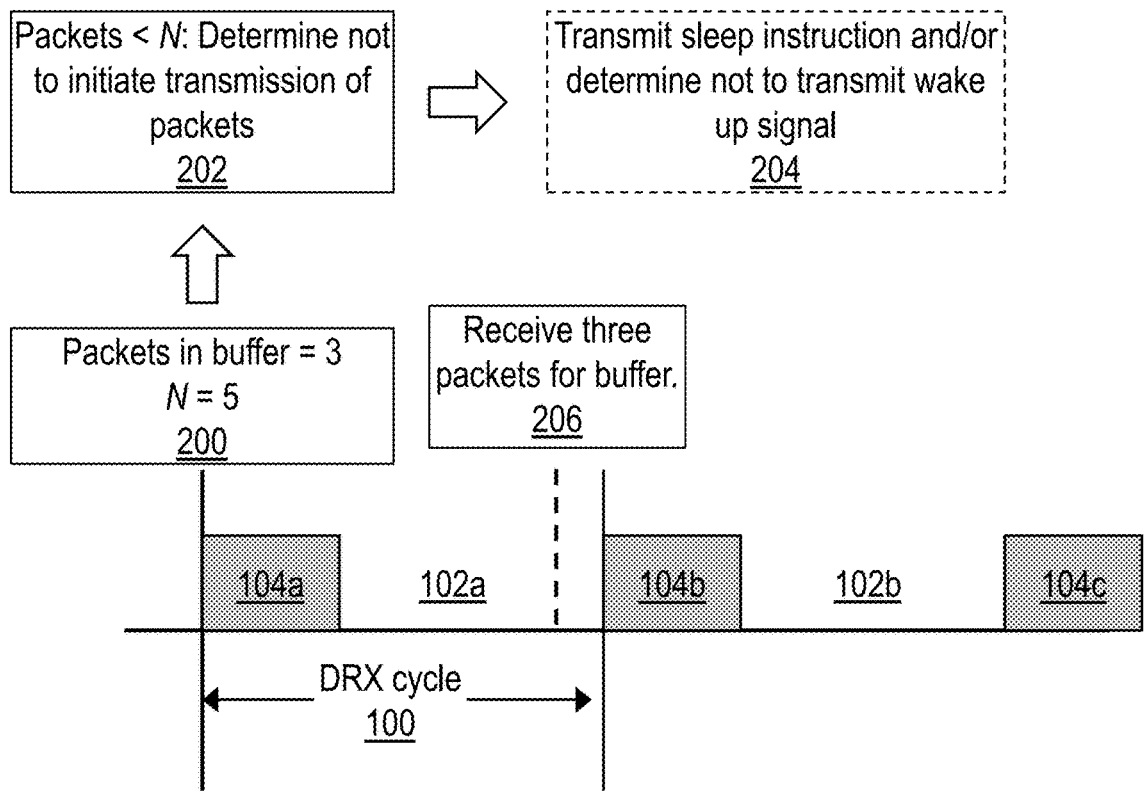
FIGS. 2A-2B are diagrams illustrating operation of an example of a DRX scheme including a minimum data unit transmission threshold, according to some implementations of this disclosure.
Figure 2B:
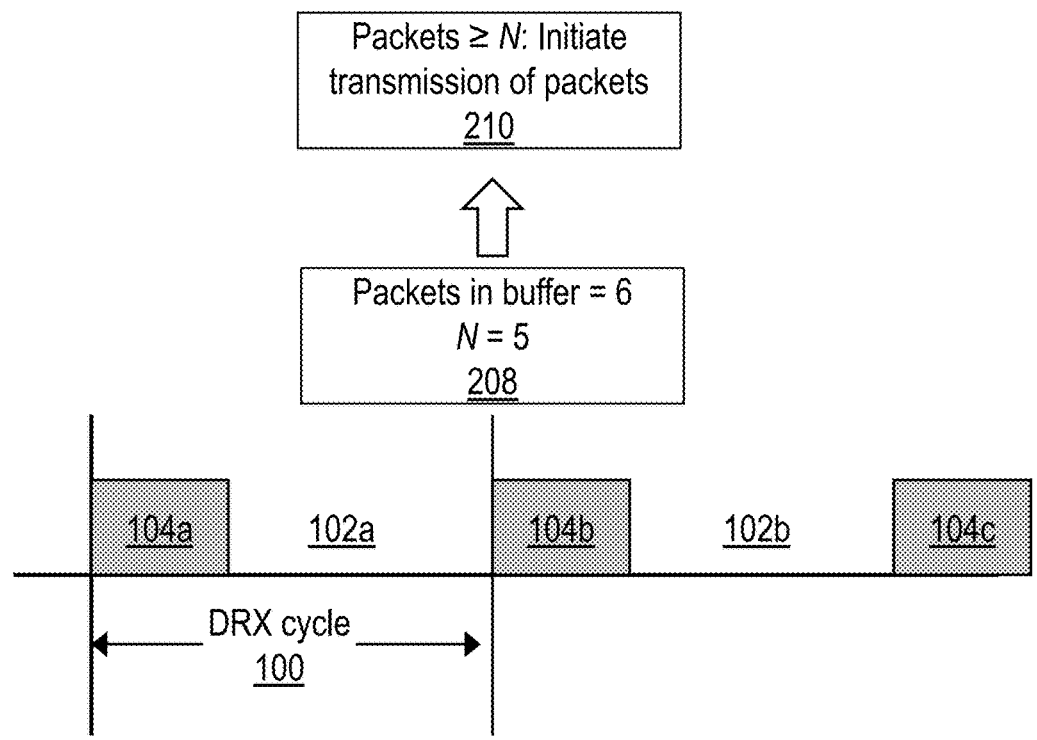

FIGS. 2A-2B illustrate an example of a DRX implementation incorporating the minimum packet transmission threshold N. As shown in FIG. 2A, for a first ON period 104a, a base station has three packets in a buffer corresponding to a mobile device, and the minimum packet transmission threshold N for that buffer is five (200). The base station can evaluate buffer status at various times to determine whether to initiate transmission of packets. For example, the base station can make the determination at the start of each ON period, can make the determination shortly before each ON period, and/or can continuously determine, as new packets are received at the base station, whether or not to initiate transmission in a next ON period. For example, when new packets are received, the base station can determine whether the new packets should cause a change in the base station's behavior for the next ON period, and, if so, the base station can update a bit or other indicator indicating whether and/or how the base station will transmit a PDCCH message to the mobile device during the next ON period. Various other determination and determination timing schemes can be used instead or additionally.

In this example, the number of packets in the buffer, three, is less than N. Accordingly, the base station determines not to initiate transmission of packets to the mobile device during ON period 104a (202). Optionally, in some implementations the base station can, based on the determination, transmit a sleep instruction to the mobile device (204), so that the mobile device enters its sleep state and does not have to consume ON-state battery power for the entire ON period 104a. Optionally, in some implementations the base station can, based on the determination, determine not to transmit a WUS to the mobile device (204), so that the mobile device enters its sleep state in response to not receiving the WUS.

During the following sleep period 102a, the base station receives three packets for the buffer. As shown in FIG. 2B, for ON period 104b, there are six packets in the buffer, which is greater than N=5 (208). Accordingly, the base initiates transmission of packets (210), e.g., one or more of the packets, such as all of the packets. Packets for which transmission has been initiated can be cleared from the buffer by the base station.

Because of the minimum packet transmission threshold N, a proportion of each DRX cycle that consists of the sleep period can increase, and/or DRX cycles can be made longer by lengthening the sleep period of each DRX cycle. Accordingly, battery consumption by mobile devices can be decreased.

Buffer states illustrated herein can correspond to determinations by the base station. For example, as shown in FIG. 2A, the base station can determine that there are three packets in the buffer (200). As shown in 2B, the base station can determine that there are six packets in the buffer (208). Analogous determinations can be made for implementations including maximum single-transmission packet numbers M, latency timer durations T, and/or multiple buffers, as described in more detail below.

Some implementations according to this disclosure include a latency timer linked to a latency timer duration T. In some implementations, when a buffer is empty, reception at the base station of a packet for the buffer triggers the base station to start a latency timer for the buffer. The latency timer is subsequently compared to T. If any unsent packets have been in a buffer for a time period of at least T, the base station initiates transmission of at least some packets from the buffer. In the absence of T, if a number of packets in a buffer is less than N and no further packets are received, the packets in the buffer will never be sent. T limits the time that a packet can remain in the buffer without transmission being initiated, improving user experience and network reliability.

Figure 3A:
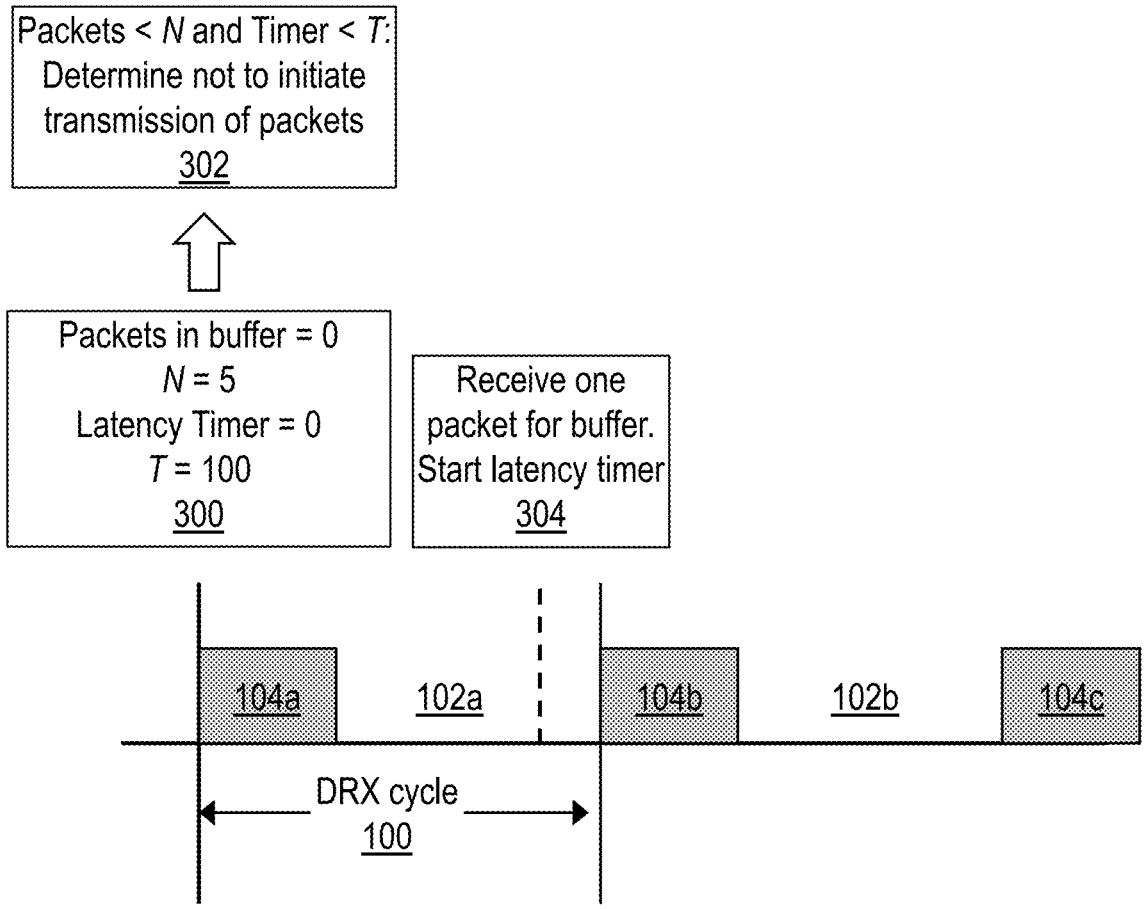
FIGS. 3A-3C are diagrams illustrating operation of an example of a DRX scheme including a latency timer, according to some implementations of this disclosure.

As shown in FIG. 3A, in an example of base station operation, for ON period 104a (300), there are zero packets in a buffer with N=5. Because there are zero packets in the buffer, the latency timer for the buffer is at zero. T for the buffer is 100 milliseconds (ms). Because the number of packets in the buffer is less than N and the latency timer is less than T, the base station determines not to initiate transmission of packets from the buffer (302) (e.g., the base station can transmit a sleep instruction to the mobile device and/or can determine not to transmit a WUS).

Figure 3B:
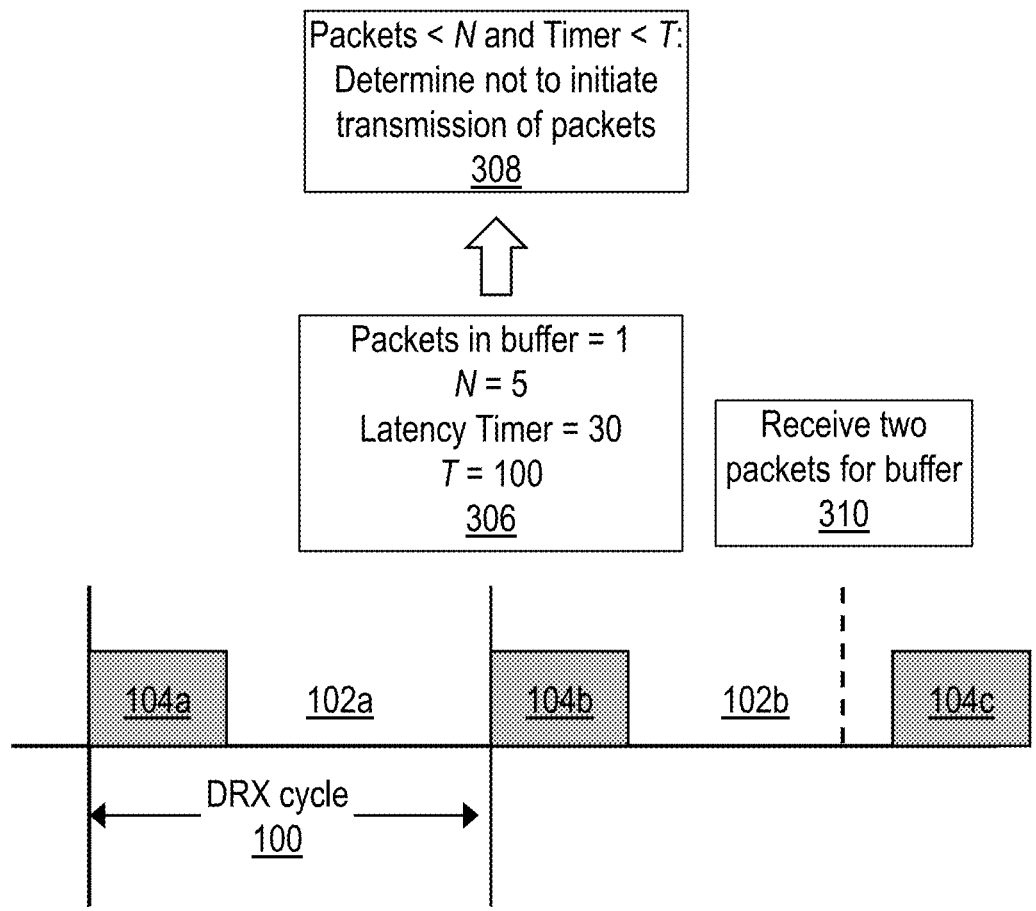

During sleep period 102a, the base station receives one packet for the buffer. In response, the base station starts the latency timer for the buffer (304). For example, starting the latency timer can include starting a timer in a memory of the base station, or, as another example, the latency timer can be "started" in that a timestamp of reception of the first packet for the empty buffer is stored; the timestamp can subsequently be used (e.g., in a comparison with a current time) to determine whether the timer is greater than or equal to T As shown in FIG. 3B, for ON period 104b, there is one packet in the buffer and the latency timer is at 30 (306), representing 30 ms since receiving the one packet at the base station. The base station determines that the number of packets is less than N and that the latency timer is less than T and, in response, determines not to initiate transmission of packets from the buffer (308) (e.g., transmits a sleep instruction to the mobile device and/or determines not to transmit a WUS to the mobile device).

Figure 3C:
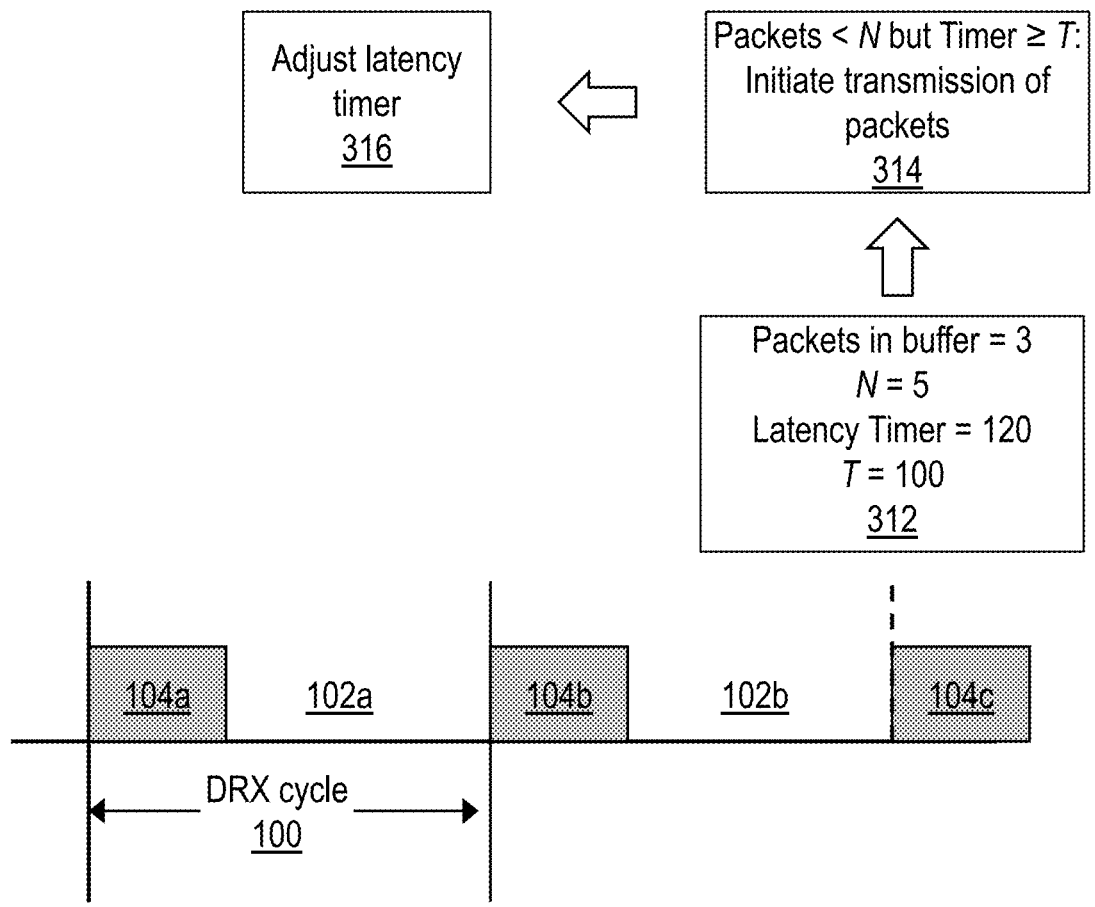

During sleep period 102b, two more packets are received for the mobile device (310). Because there is already a packet in the buffer, the latency timer is already running. As shown in FIG. 3C, for ON period 104c, there are three packets in the buffer and the latency timer is 120 (312). The base station determines that the latency timer is greater than or equal to T and, in response, initiates transmission of at least some of the packets in the buffer to the mobile device (314). The base station initiates transmission based on T even though the number of packets in the buffer is less than N.

In some implementations, in response to initiating transmission of one or more packets, the base station can adjust the latency timer (316). If the buffer is empty, the base station can reset the latency timer to zero, and the latency timer remains at zero until reception of a packet, at which point the latency timer is started. If the buffer is not empty after initiation of transmission (e.g., if a number of packets in the buffer is greater than M, as described below), in some implementations, the latency timer is restarted from zero. In some implementations, if the buffer is not empty after initiation of transmission, the latency timer is restarted from a time that a packet, for which transmission has not been initiated for the longest of all packets in the buffer, has been in the buffer (the time that the oldest packet has been in the buffer).

In some implementations, as in examples provided in this disclosure, T is expressed as a time, e.g., in milliseconds. In some implementations, T can be expressed as a different type of time-indicating value, such as a number of cycles.

Some implementations according to this disclosure include a maximum single-transmission packet number M. In the absence of M, when a base station determines to initiate transmission of packets in a buffer, the base station initiates transmission of all packets in the buffer, e.g., flushes the buffer. M puts a limit on the number of packets from a buffer for which transmission will be initiated during a single ON period: a base station, when determining to initiate transmission of packets, will initiate transmission of up to M packets. Packets in excess of M remain in the buffer for transmission in a subsequent ON period, e.g., when a number of packets in the buffer is at least N, when a latency timer for the buffer is at least T, and/or when transmission is initiated for another reason, such as based on a state of another buffer, as described in reference to FIGS. 5A-5B.

The use of M can be useful to decrease long single-transmission transmission times. Transmission of each packet is associated with a transmission time, and transmission of multiple packets is typically performed sequentially, such that transmission of n packets takes n times as long (or approximately n times as long) as transmission of a single packet. When many packets are transmitted in one transmission, the channel by which the packets are sent is consumed for the duration of the transmission. However, fewer longer-duration transmissions can be more difficult for the base station to manage than more shorter-duration transmissions. This challenge can be exacerbated for mobile devices at the cell edge, for which a lower bitrate of transmission is used (e.g., lower-rate modulation and/or encoding), leading to significantly longer per-packet transmission times. Accordingly, the maximum single-transmission packet number M can be used to split transmission of packets in a buffer across multiple ON periods, to decrease a number of long transmissions and/or put a limit on how long a transmission for a given buffer can be.

Figure 4A:
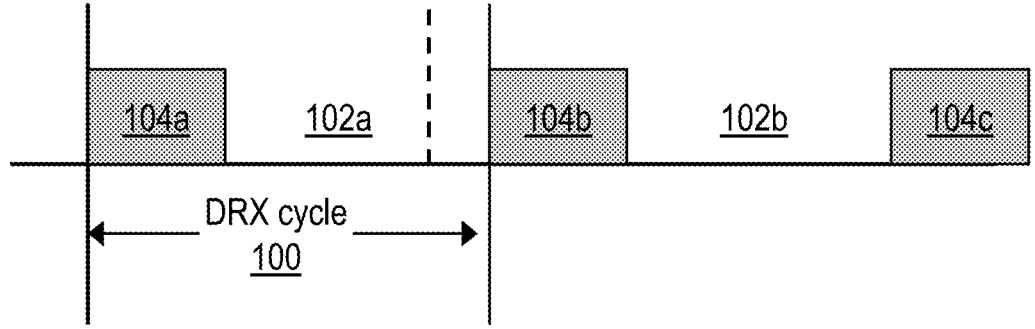
FIGS. 4A-4B are diagrams illustrating operation of an example of a DRX scheme including a maximum single-transmission data unit number, according to some implementations of this disclosure.

As shown in FIG. 4A, for ON period 104a, a number of packets in a buffer is zero, N for the buffer is five, a latency timer for the buffer is at zero (since there are no packets in the buffer), T for the buffer is 100, and M for the buffer is three (400). Because the number of packets in the buffer is less than N and the timer is less than T, the base station determines not to initiate transmission (402). Subsequently, during sleep period 102a, the base station receives six packets for the buffer, and the base station starts the latency timer from a time of reception of the first-received of the eight packets (404).

Figure 4B:
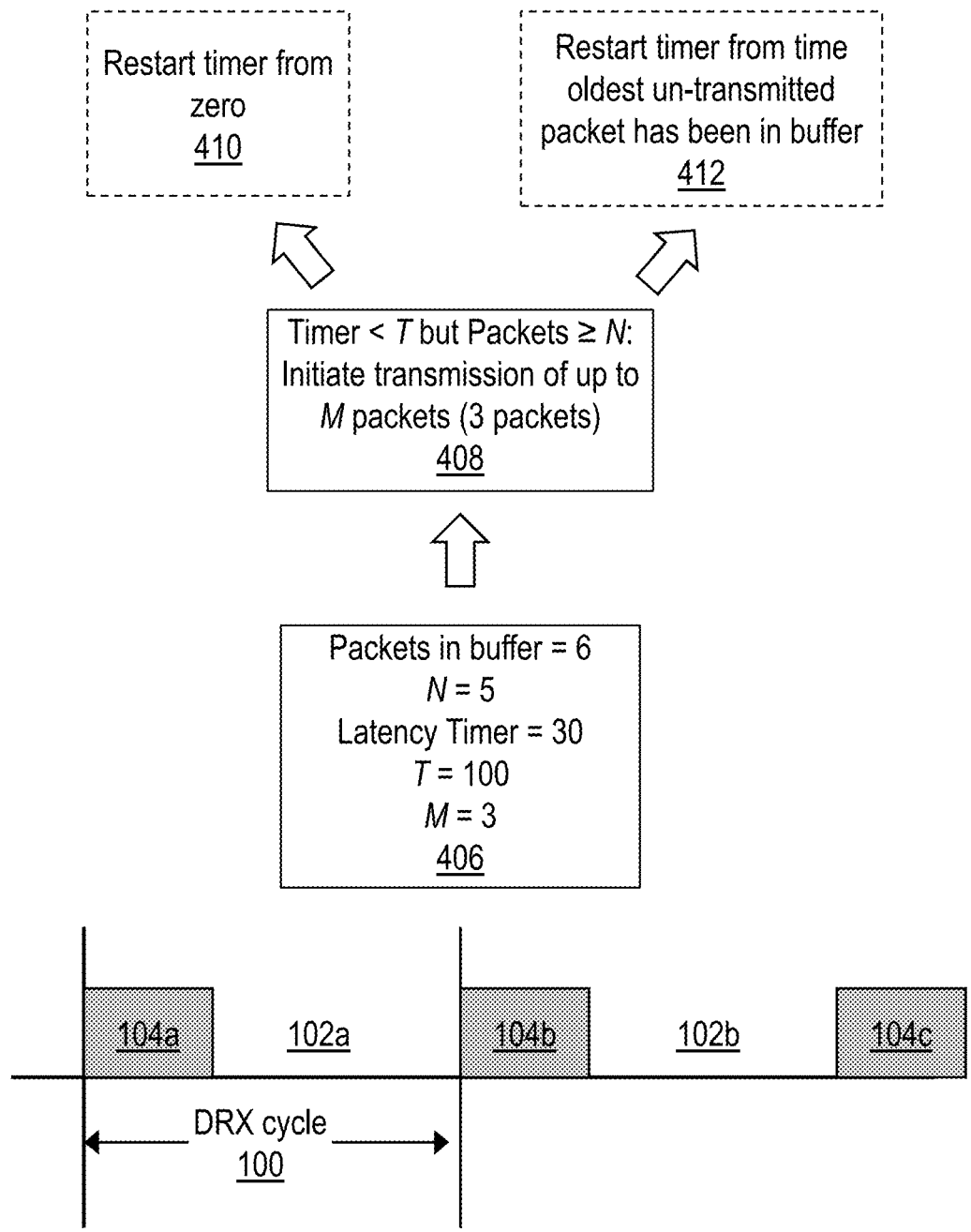

As shown in FIG. 4B, for ON period 104b, a number of packets in the buffer is six and the latency timer is 30 (406). Although the latency timer is less than T, the number of packets in the buffer is at least N, so the base station initiates transmission of up to M packets (408). In this example, M is three, so the base station initiates transmission of three packets. For example, the base station can initiate transmission of the three packets that have been in the buffer the longest. In some implementations, different packets are associated with different priority levels, and the base station initiates transmission of the three packets with the highest priority levels. In some implementations, the base station restarts the latency timer from zero in response to initiating transmission (410). In some implementations, the base station restarts the latency timer from the time that the oldest un-transmitted packet has been in the buffer (412).

M for a given buffer can be less than, equal to, or greater than N, in various implementations and depending on what choices of M and N provide the best power consumption characteristics.

In some implementations, a mobile device can be associated with multiple buffers in a base station. For example, data for different applications, or different types of data, can be separated into different buffers. These different buffers can have different DRX parameters that account for the differences between data. For example, if a first application is a high-priority application for which available data should be sent to the mobile device quickly, N for the first application's buffer can be lower than N for a second application's buffer. These and other differences between applications can be formalized as quality of service (QoS) requirements, which can be different for different applications with different priorities. Different applications can instead or additionally have different packet size and packet arrival statistics, such as different packet clusterings, different numbers of packets received, different times between packets, and other metrics that characterize how packets for the application tend to arrive at base stations for transmission to mobile devices. The different QoS requirements, packet statistics, and other parameters (e.g., as described below in reference to FIGS. 6A-6B) can be used to determine DRX parameters for different mobile devices and/or for different buffers of each mobile device.

Figure 5A:
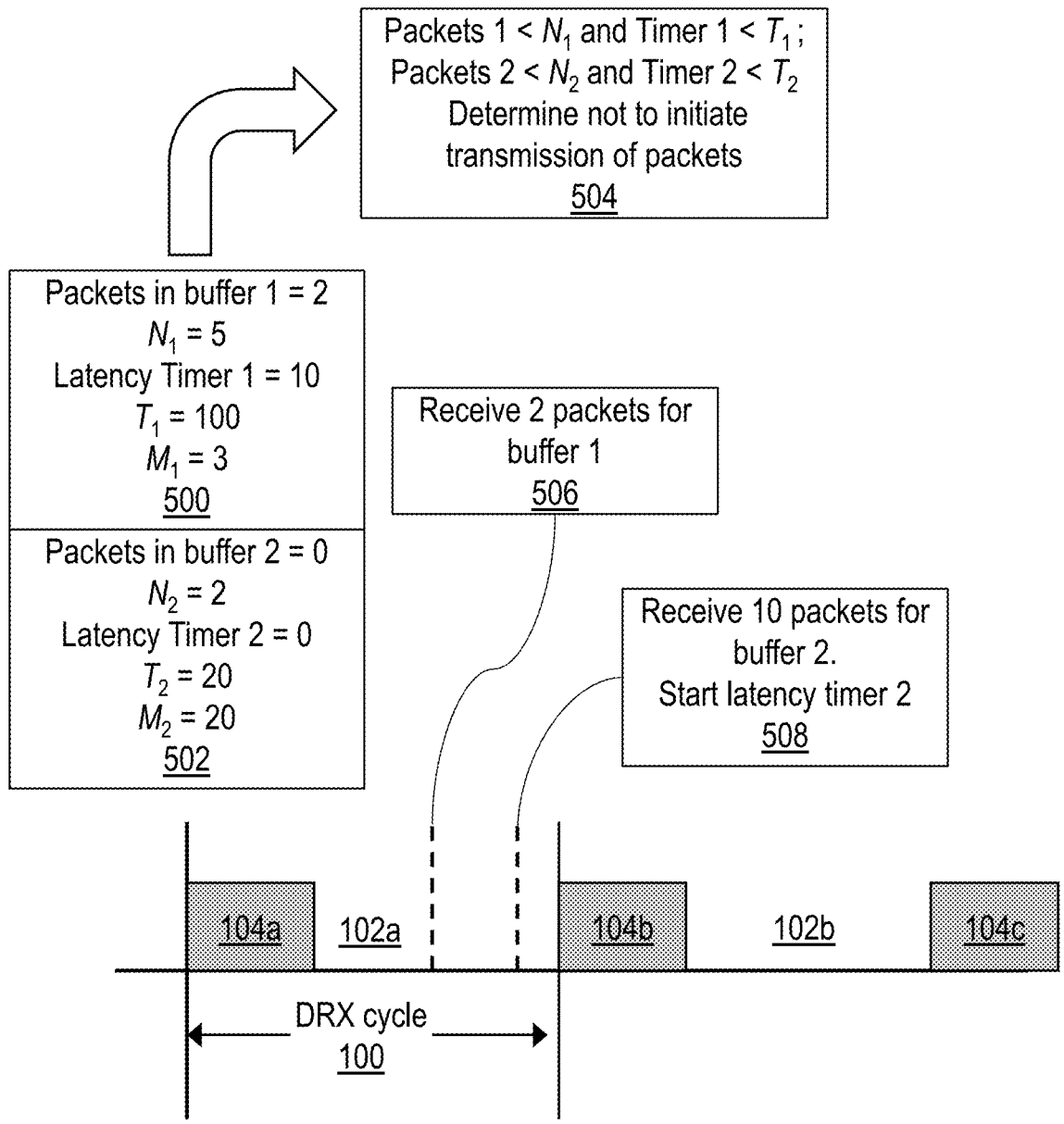
FIGS. 5A-5B are diagrams illustrating operation of an example of a DRX scheme including multiple buffers for a single device, according to some implementations of this disclosure.

As shown in FIG. 5A, a base station stores two buffers corresponding to a mobile device. For ON period 104a, a first buffer has two packets, $N_1=5$, a first latency timer at 10, $T_1=100$, and $M_1=3$ (500). A second buffer has zero packets, $N_2=2$, a second latency timer at 0, $T_2=20$, and $M_2=20$ (502). Because the first buffers has fewer than $N_1$ packets, the first latency timer is less than $T_1$, the second buffer has zero packets (fewer packets than $N_2$), and the second latency timer is less than $T_2$, the base station determines not to initiate packet transmission for either buffer (504).

Subsequently, during ON period 102a, the base station receives two packets for the first buffer (506). Also during the ON period 102a, the base station receives 10 packets for the second buffer and, in response, starts the second latency timer (508).

Figure 5B:
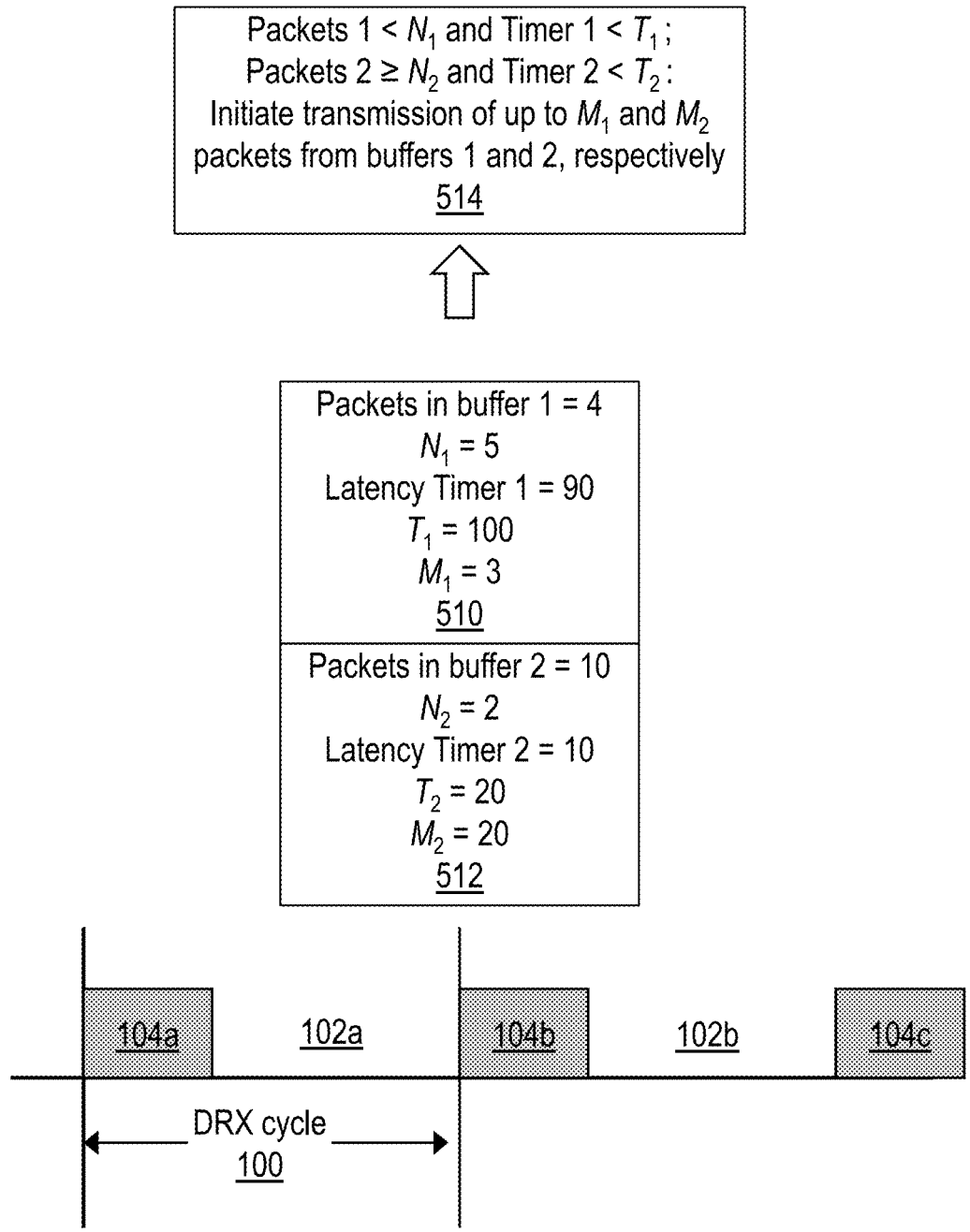

As shown in FIG. 5B, for ON period 104b, the first buffer has four packets, $N_1=5$, the first latency timer at 90, $T_1=100$, and $M_1=3$ (510). The second buffer has 10 packets, $N_2=2$, the second latency timer at 10, $T_2=20$, and $M_2=20$ (512). By itself, the first buffer has a packet number $<N_1$ and a latency timer $<T_1$, such that transmission of packets from the first buffer would not be initiated. However, in this example, the second buffer has a packet number $>N_2$. Based on this, the base station initiates transmission of up to $M_2$ packets from the second buffer (in this example, all ten packets in the buffer) and also initiates transmission of up to $M_1$ packets from the first buffer (in this example, three packets, leaving one packet remaining in the buffer) (514). The base station can then adjust the first latency timer and the second latency timer separately, as described above. In some cases, initiating transmission of packets from multiple buffers based on a state of a first buffer can improve power consumption characteristics, because the mobile device will already be remaining in its ON state to coordinate transmission from the first buffer; transmission initiation of packets from the other buffers may therefore be associated with relatively small marginal power consumption.

However, other implementations can be used instead or additionally. In some implementations, transmission initiation is determined on a buffer-by-buffer basis, such that, for the example situation illustrated in FIG. 5B, transmission of packets from the first buffer would not be initiated. In some implementations, either configuration can be depending on a current state of the cellular network, e.g., the base station can intelligently determine, based on parameters indicating network state, whether, based on determining to initiate transmission of packets from one buffer, transmission of packets from other buffers should also be initiated.

Figure 6A:
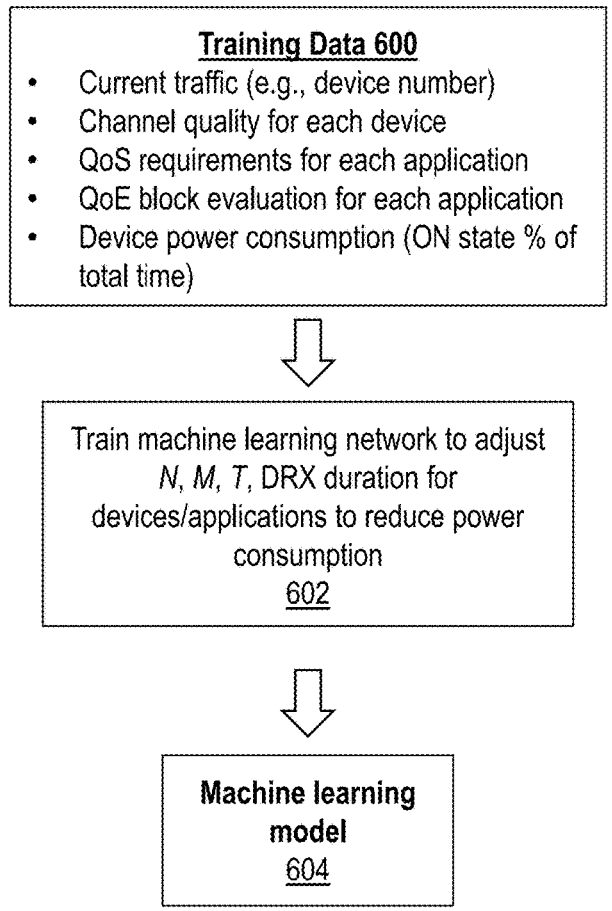
FIGS. 6A-6B are diagrams illustrating examples of training and use of a machine learning model, according to some implementations of this disclosure.

DRX parameters can be determined in various ways. In some implementations, DRX parameters are determined using machine learning-based methods. For example, as shown in FIG. 6A, a machine learning network can be trained based on training data 600. The training data 600 can include, for example, one or more of: an amount of traffic being handled by a base station, such as a number of mobile devices being managed by the base station and/or a number of packets being sent through the base station; a channel quality indicator (CQI) for each device; QoS for each device and/or for different applications on each device; quality of experience (QoE) block evaluation for each application; and/or power consumption for each device in the training data (e.g., a percentage of each device's time in which the device is in the ON state). QoE is class of metrics that describe a user experience for the end user of the mobile device. For example, a mean opinion score (MOS), calculated based on packet loss, packet delay, and packet jitter, can indicate a quality of voice reception. QoE can be estimated for use in training data based on parameters such as average packet loss rate, average and/or maximum packet delay, and/or average and/or maximum packet jitter.

Based on this and/or other training data 600, the machine learning network is trained to adjust one or more of N, M, T, and DRX duration (cycle time) for each device and/or for applications of each device to reduce power consumption for devices (602). The machine network can be any suitable type of machine learning network, such as a neural network (e.g., a convolutional neural network (CNN) or a probabilistic neural network (PNN)), a different type of machine learning/artificial intelligence implementation (e.g., a genetic algorithm-based network or a support-vector machine), or a combination of different types of machine learning network. Training the network can include iteratively adjusting weights and parameters of the network (e.g., parameters of different nodes across multiple hidden layers of the network, parameters of an activation layer, etc.) in order to reduce a value of a loss function and/or satisfy one or more other conditions. In some implementations, at least one loss function for training the machine learning network is based on power consumption of devices in the training data.

Figure 6B:
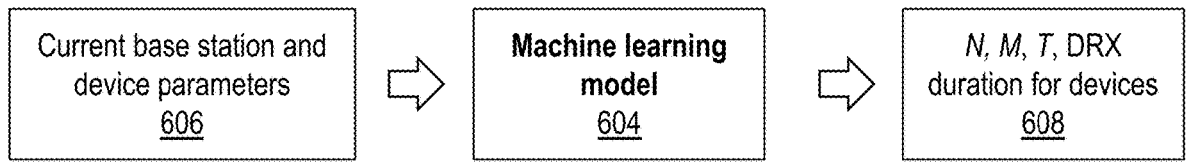

As a result of the training, a trained machine learning model 604 is obtained. This machine learning model 604 can be stored on base stations. As shown in FIG. 6B, the base station can use current data associated with the base station and with devices being managed by the base station (e.g., one or more types of data included in the training data 600 as described in reference to FIG. 6A) as inputs to the machine learning model 604 (606), such that the machine learning model 604 determines, as output, N, M, T, and/or DRX duration. In this example, DRX duration, rather than ON period duration or sleep period duration, is determined, because, with the use of sleep instructions and/or WUS-based schemes, the ON period duration and sleep period duration become less important. However, those and/or other parameters can be determined according to some implementations of this disclosure, instead of or in addition to DRX duration.

At least some of the determined parameters can be transmitted to mobile devices. For example, DRX duration can be transmitted so that the mobile devices' ON periods are synced with when the base station expects the mobile devices to be ON.

Various implementations described above can be combined in different ways. For example, in some implementations, N and M are used without using T As another example, in some implementations, an inactivity timer (as described in reference to FIG. 1B) can be used in conjunction with N, T, and/or M. When an inactivity timer is used, the use of N can provide advantages compared to scheme without N, because even a small-packet-number transmission initiation can trigger the start of the inactivity timer. When the average packet number per transmission initiation is increased through the use of N, occurrences in which the inactivity timer is triggered for only a small number of packets can be decreased in some implementations.

Figure 7:
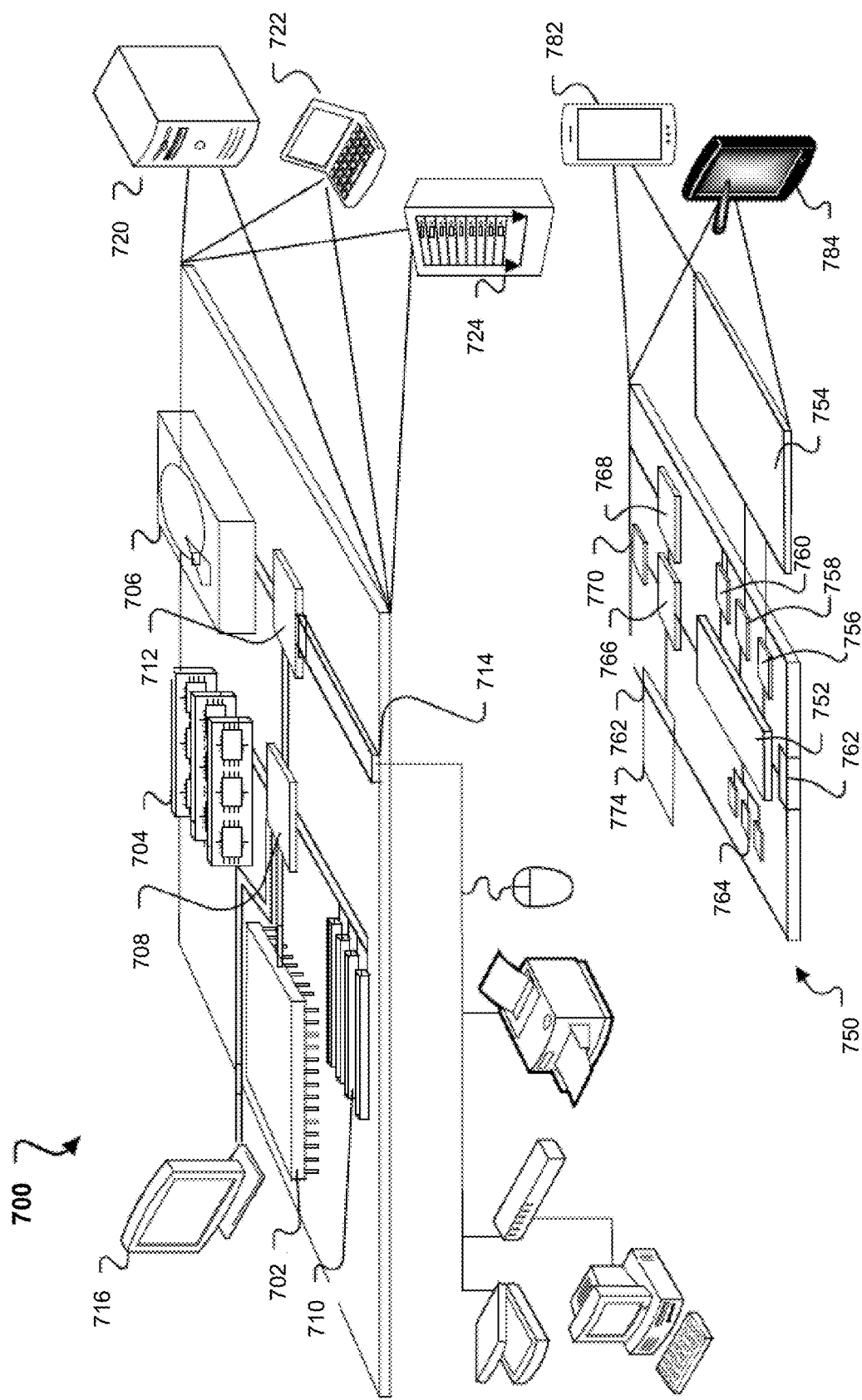
FIG. 7 is a diagram illustrating examples of computing devices, according to some implementations of this disclosure.

FIG. 7 shows an example of a computing device 700 and a computing device 750, which may be used with the techniques described here. The computing device 700, the computing device 750, or a combination of these devices may represent UE (e.g., a mobile device performing DRX cycles), a base station (e.g., a base station implementing managed DRX including N, M, and/or T), or another element described in this disclosure. Computing device 700 can represent various forms of digital computers (including mobile computers that are mobile devices), such as laptops, desktops, workstations, personal digital assistants, servers, blade servers, mainframes, base stations, and other appropriate computers. Computing device 750 is intended to represent at least various forms of mobile devices, such as personal digital assistants, cellular telephones, smartphones, and other similar computing devices, and/or can also represent network devices such as base stations. The components shown here, their connections and relationships, and their functions, are meant to be examples only, and are not meant to limit implementations of the techniques described and/or claimed in this document.

Computing device 700 includes a processor 702, memory 704, a storage device 706, a high-speed controller 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. In addition, it may be implemented in a base station of a cellular network. The computing device 700 can include a transceiver to transmit data to and/or receive data from (communicate with) one or more other devices, such as user equipment, back-haul devices, core network devices, and/or other devices. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone. It may also be implemented as part of a smartphone 782, personal digital assistant, tablet computer 784, or other similar mobile device. The computing device 750 may be implemented as part of a kiosk device.

Figure 8:
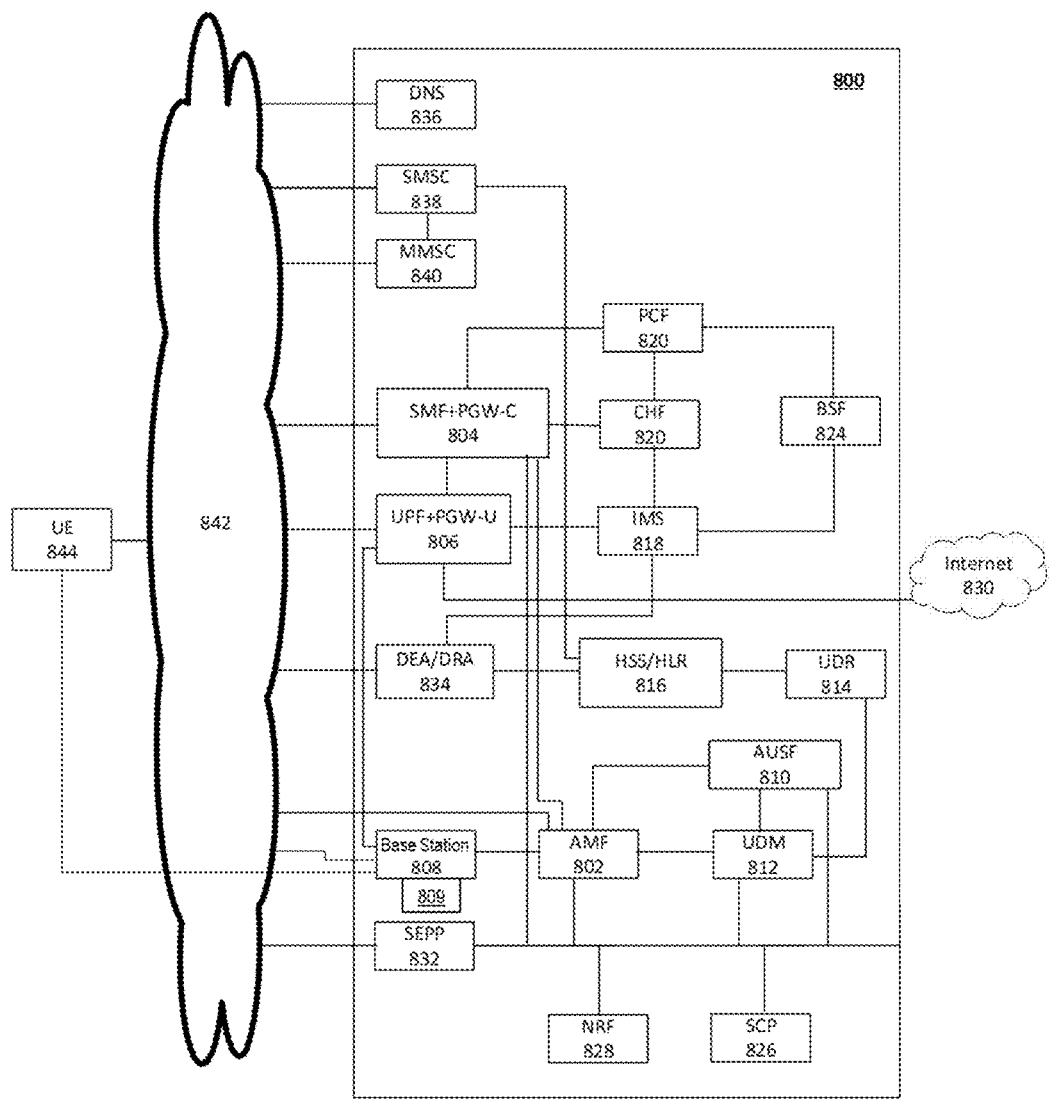
FIG. 8 is a diagram illustrating an example of an environment in which embodiments according to this disclosure can be implemented.

FIG. 8 illustrates an example of a network environment 800 in which embodiments according to this disclosure can be implemented. UE 844 is connected to the network environment 800. The network environment 800 (sometimes referred to as an "environment") includes a set of multiple devices, modules, and functions that are configured to jointly enable wireless communication. For example, the network environment 800 can include a 5G network that includes a set of multiple devices, radio access network (RAN)/core network functions, and application functions that are configured and integrated to jointly enable wireless communication. An environment, such as the environment 800, can be a portion of a 5G New Radio ("5G-NR" or simply "5G") cellular network environment. Standards for 5G cellular network architectures have previously been described, for example, in 3GPP TS 23.501 (for 5G networks) and 3GPP TS 23.410 (for long-term evolution "LTE" networks) (the entireties of which are hereby incorporated by reference). The lines depicted in FIG. 8 that connect network elements are indicative of the possibility of direct communication between those network elements, but these examples of direct connections are not exhaustive, and other suitable connection configurations are also within the scope of this disclosure.

Network environment 800 includes a packet core network, which includes an access management function (AMF) 802, a session management function and packet data network gateway-control module (SMF+PGW–C) 804, a user plane function and packet data network gateway-user plane module (UPF+PGW–U) 806, and a policy control function (PCF) 820. In some implementations, the AMF 802 receives connection and session related information from UE 844 and handles connection and mobility management tasks. The AMF 802 forwards messages related to session management to the SMF+PGW–C module 804. The SMF+PGW–C module 804 and UPF+PGW–U module 806 jointly manage sessions and are configured using Control and User Plane Separation (CUPS). The PCF 820 communicates with the SMF+PGW–C module 804, governing control plane functions via defined policy rules. The UPF+PGW–U module 806 can provide access to the Internet 830 for data applications and the IP Multimedia Subsystem (IMS) core module 818 for voice applications. The IMS core module 818 is a separate application core network from the packet core network and supports voice services, messaging, voice calls, etc.

The environment 800 can further include a charging function (CHF) 822 and a binding support function (BSF) 824. The CHF 822 supports online and offline charging features and completes billing functions. The BSF 824 tracks sessions that are located anywhere in the environment 800, but share common criteria, such as subscriber identifiers. The BSF 824 communicates with the PCF 820 and binds application-function requests to specific PCF instances, enabling policy scaling of the environment 800.

The environment 800 also includes a base station 808 (e.g., a 5G base station), which handles run-side aspects of the network environment 800 and communicates, either directly or indirectly, with the packet core network elements such as AMF 802, SMF+PGW–C module 804, and UPF+PGW–U module 806, and/or with UE 844. In some implementations, the base station 808 includes at least some of the network elements that are shown in FIG. 8 as separate from the base station 808, such as AMF 802, SMF+PGW–C module 804, and/or UPF+PGW–U module 806. In some implementations, the base station 808 communicates directly with the UE 844. In some implementations, the base station 808 communicates with the UE 844 via external system 842. In some implementations, the base station 808 communicates with the UE 844 via the UPF+PGW-U module 806 or another element in communication with the external system 842 and/or the UE 844. The base station 808 can include computing components and networking components as described in reference to FIG. 7 (e.g., as described for computing devices 700 and/or 750), such as a transceiver 809 to transmit data to and/or receive data from UE 844, directly or via one or more other network elements. The base station 808 can perform one or more DRX management and/or transmission processes, as described throughout this disclosure.

The environment 800 further includes network elements to manage user or subscriber information. For example, the environment 800 includes an authentication service function (AUSF) 810 for user authentication and a unified data management (UDM) module 812. The user database is stored in a unified data repository (UDR) 814. The UDM 812 communicates with the AMF 802, AUSF 810, and the UDR 814 to provide centralized control of network user data. For interworking with 2G, 3G, and 4G network elements, the environment 800 also includes a Home Subscriber System and Home Location Register (HSS/HLR) module 816, which stores subscriber information, location and SIM details, and authentication keys.

The environment 800 further includes a service communication proxy (SCP) 826 and a network repository function (NRF) 828. In accordance with current 5G standards, in some implementations, network functions are based on HTTP version 2, and use the SCP 826 and NRF 828 to communicate. The NRF 828 is used to discover network functions in the environment 800, and the SCP 826 is used to provide a single point of entry for a cluster of discovered network functions, serving as a central control point in the signaling network core.

The environment 800 further includes a security edge protection proxy (SEPP) 832, a diameter edge agent and diameter routing agent (DEA/DRA) module 834, and a domain name system (DNS) 836. The SEPP 832 is a security proxy through which all signaling traffic across operator networks is expected to transit. The DEA/DRA module 834 manages traffic and congestion of messages routed across the environment 800. The DNS 836 is a naming database in which internet domain names are located and translated into internet protocol (IP) addresses.

The environment 800 further includes a short message service center (SMSC) 838 and a multimedia message service center (MMSC) 840 configured to receive, store, route, and forward SMS messages and MMS messages, respectively.

The network environment 800 is configured to interact with external systems 842. In some implementations, the external systems 842 can include another network such as a 4G or 5G roaming partner network. For example, the environment 800 can interact with a roaming partner network using an IP Packet eXchange (IPX) telecommunications interconnection model provided between the two network environments. In other examples, the environment 800 can interact directly with the roaming partner network environment without an IPX provider in between the two networks.

In some implementations, the external systems 842 can include a message aggregator configured to aggregate messages and route a portion of the aggregated messages to the environment 800. For example, the aggregated messages can be SMS or MMS messages.

The UE 844 can interact with the network environment 800 indirectly through the external systems 842 or directly with the network environment 800 (e.g., via the base station 808). In some cases, the UE 844 can be a subscriber to the network environment 800 (e.g., a subscriber to a service provider of the cellular network). In other cases, the UE 844 can be a non-subscriber roaming on the network environment 800.

FIG. 9 illustrates a process 900 that can be performed according to some implementations of this disclosure. In the process 900, a base station of a cellular network determines that a mobile device is in an ON period of a discontinuous reception (DRX) cycle (902). For example, the base station can make the determination based having previously sent DRX scheduling information to the mobile device to coordinate ON period and sleep period timing with the mobile device.

The base station determines that a number of data units in a buffer corresponding to the mobile device is at least a threshold value, where the threshold value is a number greater than one (904). For example, the data units can be packets or bytes. For example, the threshold value can be the minimum packet (data unit) transmission threshold N as described throughout this disclosure.

In response to the determinations that the number of data units in the buffer is at least the threshold value and that the mobile device is in the ON period, the base station initiates transmission, to the mobile device, of at least some of the data units in the buffer (906). For example, the base station can initiate transmission of all of the data units in the buffer or the mobile device can initiate transmission of up to M data units, where M is the maximum single-transmission packet (data unit) value described throughout this disclosure. For example, the base station can initiate transmission by transmitting a DCI message that coordinates transmission of the packets to the mobile device.

Some features described may be implemented in digital and/or analog electronic circuitry or in computer hardware, firmware, software, or in combinations of them. Some features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output, by discrete circuitry performing analog and/or digital circuit operations, or by a combination thereof.

Some described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

A number of implementations have been described. Nevertheless, it will be understood that various modifications may be made. For example, although references have been made to packet-denominated values, such as a minimum packet transmission threshold N and a maximum single-transmission packet number M, in some implementations other types of data units can be used, such as bytes, bits, groupings of packets, files, or any other suitable data unit that can be counted for comparison to N and/or M. For example, in some implementations N is a minimum byte transmission threshold and M is a maximum single-transmission byte number. References to "packets" throughout this disclosure can, in some implementations, refer generally to data units such as bytes, bits, files, or other data units. In some implementations, using bytes or bits may allow for more accurate determination of how much data is to be sent, because different packets may contain different numbers of bytes/bits. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    determining, by a base station of a cellular network, that a mobile device is in an ON period of a discontinuous reception (DRX) cycle;
    determining, by the base station, that a number of data units in a buffer corresponding to the mobile device is at least a threshold value, wherein the threshold value is a number greater than one; and
    in response to determining that the number of data units in the buffer is at least the threshold value and that the mobile device is in the ON period, initiating transmission, by the base station to the mobile device over the cellular network, of at least some of the data units in the buffer.

2. The method of claim 1, comprising, subsequent to initiating transmission of the at least some of the data units:
    determining, by the base station, that the mobile device is in a second ON period of the DRX cycle;
    determining, by the base station, that a second number of data units in the buffer is less than the threshold value, wherein the second number of data units is greater than zero; and
    in response to determining that the second number of data units in the buffer is less than the threshold value, determining, by the base station, to not initiate transmission of any of the data units in the buffer to the mobile device.

3. The method of claim 2, wherein determining to not initiate transmission of any of the data units in the buffer comprises at least one of:
    transmitting a sleep instruction to the mobile device, or
    determining to not transmit a wake up signal to the mobile device.

4. The method of claim 1, wherein initiating transmission of at least some of the data units in the buffer comprises initiating transmission of a predetermined maximum number of data units, wherein the predetermined maximum number of data units is less than a number of all data units in the buffer.

5. The method of claim 1, comprising, subsequent to initiating transmission of the at least some of the data units:
    determining, by the base station, that the mobile device is in a second ON period of the DRX cycle;
    determining, by the base station, that a time duration an un-transmitted data unit has been in the buffer is greater than or equal to a time threshold, wherein a second number of data units in the buffer is less than the threshold value, and wherein the second number of data units is greater than zero; and
    in response to determining that the time duration the un-transmitted data unit has been in buffer is greater than or equal to the time threshold and that the mobile device is in the second ON period, initiating transmission, by the base station to the mobile device over the cellular network, of at least some of the data units in the buffer.

6. The method of claim 1, comprising, subsequent to initiating transmission of the at least some of the data units:
    determining, by the base station, that the mobile device is in a second ON period of the DRX cycle;
    determining, by the base station, that a time duration since a last prior initiation of transmission from the buffer to the mobile device is greater than or equal to a time threshold, wherein a second number of data units in the buffer is less than the threshold value, and wherein the second number of data units is greater than zero; and
    in response to determining that the time duration since the last prior initiation of transmission from the buffer to the mobile device is greater than or equal to the time threshold and that the mobile device is in the second ON period, initiating transmission, by the base station to the mobile device over the cellular network, of at least some of the data units in the buffer.

7. The method of claim 1, comprising, in response to initiating the transmission:
    resetting a latency timer of the buffer to zero, or
    resetting the latency timer of the buffer to a time that an oldest data unit in the buffer has been in the buffer.

8. The method of claim 1, wherein the buffer is a first buffer corresponding to the mobile device, wherein the threshold value is a first threshold value, wherein the base station stores a second buffer corresponding to the mobile device,
wherein the second buffer is associated with a second threshold value for transmission of data units to the mobile device, the second threshold value different from the first threshold value.

9. The method of claim 8, wherein a number of data units in the second buffer is less than the second threshold value during the ON period, and wherein the method comprises initiating transmission, by the base station to the mobile device over the cellular network, of at least some of the data units in the second buffer during the ON period based on determining that the number of data units in the buffer is at least the threshold value.

10. The method of claim 8, wherein the first buffer is associated with a first application of the mobile device, and the second buffer is associated with a second application of the mobile device.

11. The method of claim 1, comprising:
determining the threshold value based on at least one of a quality of service requirement of an application associated with the buffer, a number of mobile devices being managed by the base station, or a channel quality of the mobile device.

12. The method of claim 1, wherein the data units in the buffer are packets.

13. A base station configured to operate in a cellular network, the base station comprising:
at least one processor; and
memory storing instructions that, when executed by the at least one processor, cause the at least one processor to perform operations comprising:
determining that a mobile device is in an ON period of a discontinuous reception (DRX) cycle;
determining that a number of data units in a buffer corresponding to the mobile device is at least a threshold value, wherein the threshold value is a number greater than one; and
in response to determining that the number of data units in the buffer is at least the threshold value and that the mobile device is in the ON period, initiating transmission, to the mobile device over the cellular network, of at least some of the data units in the buffer.

14. The base station of claim 13, wherein the operations comprise, subsequent to initiating transmission of the at least some of the data units:
determining that the mobile device is in a second ON period of the DRX cycle;
determining that a second number of data units in the buffer is less than the threshold value, wherein the second number of data units is greater than zero; and
in response to determining that the second number of data units in the buffer is less than the threshold value, determining to not initiate transmission of any of the data units in the buffer to the mobile device.

15. The base station of claim 14, wherein determining to not initiate transmission of any of the data units in the buffer comprises at least one of:
transmitting a sleep instruction to the mobile device, or
determining to not transmit a wake up signal to the mobile device.

16. The base station of claim 13, wherein initiating transmission of at least some of the data units in the buffer comprises initiating transmission of a predetermined maximum number of data units, wherein the predetermined maximum number of packets is less than a number of all data units in the buffer.

17. The base station of claim 13, wherein the operations comprise, subsequent to initiating transmission of the at least some of the data units:
determining, by the base station, that the mobile device is in a second ON period of the DRX cycle;
determining, by the base station, that a time duration an un-transmitted data unit has been in the buffer is greater than or equal to a time threshold, wherein a second number of data units in the buffer is less than the threshold value, and wherein the second number of data units is greater than zero; and
in response to determining that the time duration the un-transmitted data unit has been in buffer is greater than or equal to the time threshold and that the mobile device is in the second ON period, initiating transmission, by the base station to the mobile device over the cellular network, of at least some of the data units in the buffer.

18. The base station of claim 13, wherein the buffer is a first buffer corresponding to the mobile device, wherein the threshold value is a first threshold value,
wherein the base station stores a second buffer corresponding to the mobile device,
wherein the second buffer is associated with a second threshold value for transmission of data units to the mobile device, the second threshold value different from the first threshold value.

19. The base station of claim 13, wherein the operations comprise:
determining the threshold value based on at least one of a quality of service requirement of an application associated with the buffer, a number of mobile devices being managed by the base station, or a channel quality of the mobile device.

20. One or more non-transitory, computer-readable media storing instructions that, when executed by at least one processor, cause the at least one processor to perform operations comprising:
determining, by a base station of a cellular network, that a mobile device is in an ON period of a discontinuous reception (DRX) cycle;
determining, by the base station, that a number of data units in a buffer corresponding to the mobile device is at least a threshold value, wherein the threshold value is a number greater than one; and
in response to determining that the number of data units in the buffer is at least the threshold value and that the mobile device is in the ON period, initiating transmission, by the base station to the mobile device over the cellular network, of at least some of the data units in the buffer.

* * * * *